United States Patent [19]
Walter et al.

[11] 3,967,865
[45] July 6, 1976

[54] BALL BOX

[75] Inventors: Lothar Walter, Schweinfurt; Erich Burkl, Stammheim; Rainer Schürger, Schwanfeld; Armin Olschewski, Schweinfurt, all of Germany

[73] Assignee: SKF Industrial Trading and Development Company, B.V., Jutphaas, Netherlands

[22] Filed: Oct. 30, 1974

[21] Appl. No.: 519,336

[30] Foreign Application Priority Data
Dec. 21, 1973 Germany.................... 7345379[U]

[52] U.S. Cl................................ 308/6 C; 308/185

[51] Int. Cl.$^2$......................................... F16C 29/06
[58] Field of Search................... 308/6 R, 6 C, 185

[56] References Cited
UNITED STATES PATENTS
3,844,629   10/1974   Haines .............................. 308/6 C

*Primary Examiner*—M. H. Wood, Jr.
*Assistant Examiner*—Gene A. Church
*Attorney, Agent, or Firm*—Daniel M. Rosen

[57] ABSTRACT

A ball box having a plurality of ball races formed in pairs in a cage, the ball race pairs being separated by a cross-piece having a zero width at the level of the ball pitch circle.

4 Claims, 4 Drawing Figures

BALL BOX

THE INVENTION

This invention relates to a ball box construction, and particularly to a ball box with continuous ball races located in a cage. In such a design, the axially directed return channels adjacent to each other are provided in pairs in the load-free zone, each channel of a pair separated from the other by means of an axially directed cross-piece.

Ball boxes of such designs are known. The race supports located in the loaded zone are designed such that, in each case, the balls of two ball races can roll side by side. In the region of the front sides of the ball box, the balls are deflected from the loaded zone into the return channel or vice versa.

The main object of the present invention is to provide an improved ball box construction.

A further object of the invention is to improve the supporting capacity of a ball box of the type described above without impairing the satisfactory circulation of the balls.

In accordance with the present invention, the present invention provides a ball box construction achieving the foregoing objects by providing a slight separation between the return channels sufficient to prevent contact of the balls in adjacent ball races, the width of the cross-piece providing such separation measuring zero in the circumferential direction at the level of the ball pitch circle in the return channels. The ball box formed according to the innovation thus meets the requirement of being able to contain a maximum number of race supports at the circumference of the ball box. In this way, the number of balls and therefore the supporting capacity of the ball box is increased. Furthermore, as a result of the space gained by the small width of the cross-piece, larger balls can be used, having further favorable effect on the supporting capacity.

In a preferred embodiment of the invention, the cross-pieces are provided with tapered cross-section in the direction of the ball pitch circle.

Alternatively, the objects are achieved and the balls prevented from falling out of the return channels by providing the radially outer cross-pieces in the form of wires contacting the balls with both ends of the wires being attached to the cage.

Further objects and advantages of the present invention will become more apparent from the following more detailed description of the embodiments, taken in connection with the appended drawings, wherein:

FIG. 2a is a top view of the ball box according to FIG. 1a; and

FIG. 2b is a top view of the ball box according to FIG. 2a.

Figures 1A, 1B:
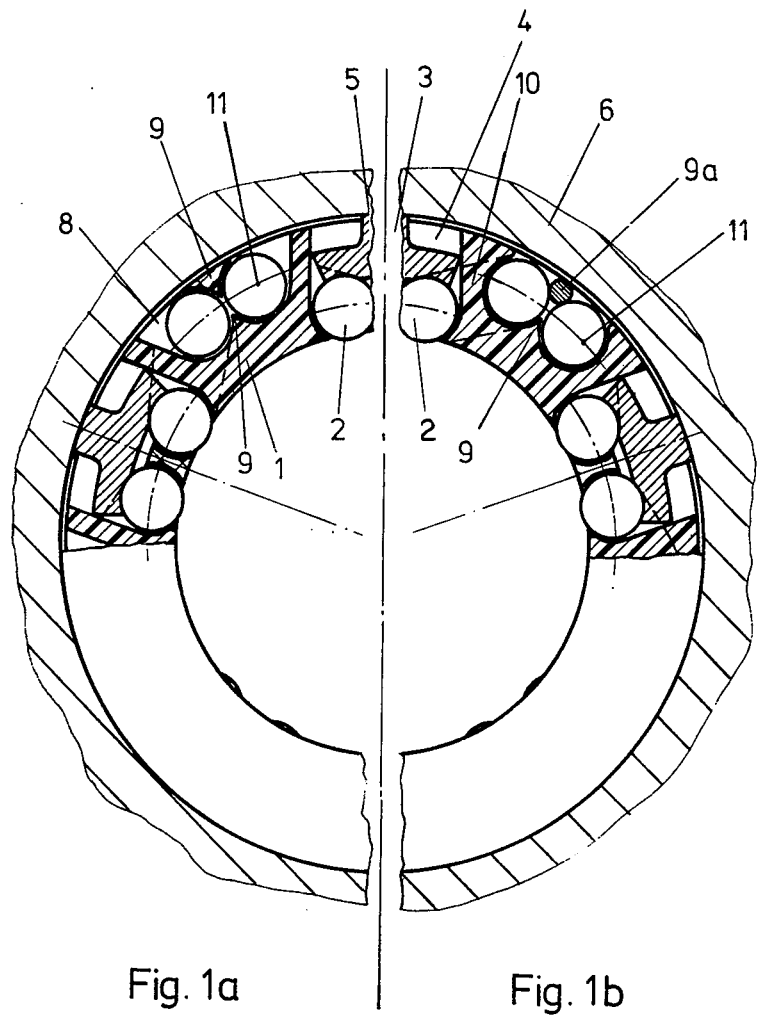
FIG. 1a is a cross-section through a ball box in accordance with the invention.
FIG. 1b is a cross-section through a modified embodiment of the invention.

Referring now to the Figures, the ball boxes shown are used for the axial movement of an axle or shaft in a housing or, conversely, of a housing on an axle. For this purpose, a cage 1 which may be made, for example, of plastic or like material, is provided wherein two rows of balls 2 circulate. In the loaded zone, the balls 2 roll off in pairs on common race supports 3, which are made of steel. The race supports 3 are inserted in openings 4 of the cage 1 and are braced against the outer circumference 5 in the bore of a housing 6. The balls 2 in the loaded zone project radially inward from the cage 1, so that they can contact an axle (not shown).

Provided in the load-free zone for the balls 2 are a pair of adjacent, axially directed, return channels 8, open in the direction of the outer circumference of the cage 1. The return channels 8 are separated from each other pairwise by axially directed cross-pieces 9.

During circulation, the balls 2 are deflected in the region of a first front side of the ball box by deflecting channels 10. The channels 10 deflect the balls 2 from the loaded zone into the load-free zone, i.e., into the return channels 8. In the region of the other front side of the ball box, they are again conducted by the deflecting channels 10 from the return channels 8 into the loaded zone.

In order to be able to house a maximum number of continuously circulating balls in the ball races, the cross-pieces 9, which separate the adjacent return channels 8 from each other, are made in such a way that the balls of two adjacent ball races are just able to avoid contact at the optimum clearance. In this way, the space available in cage 1 is utilized in such a way that the deflecting radius in the deflecting channels 10 can be optimally designed in accordance with the diameter of the balls 2, and the number of races maximized.

Figures 2A, 2B:
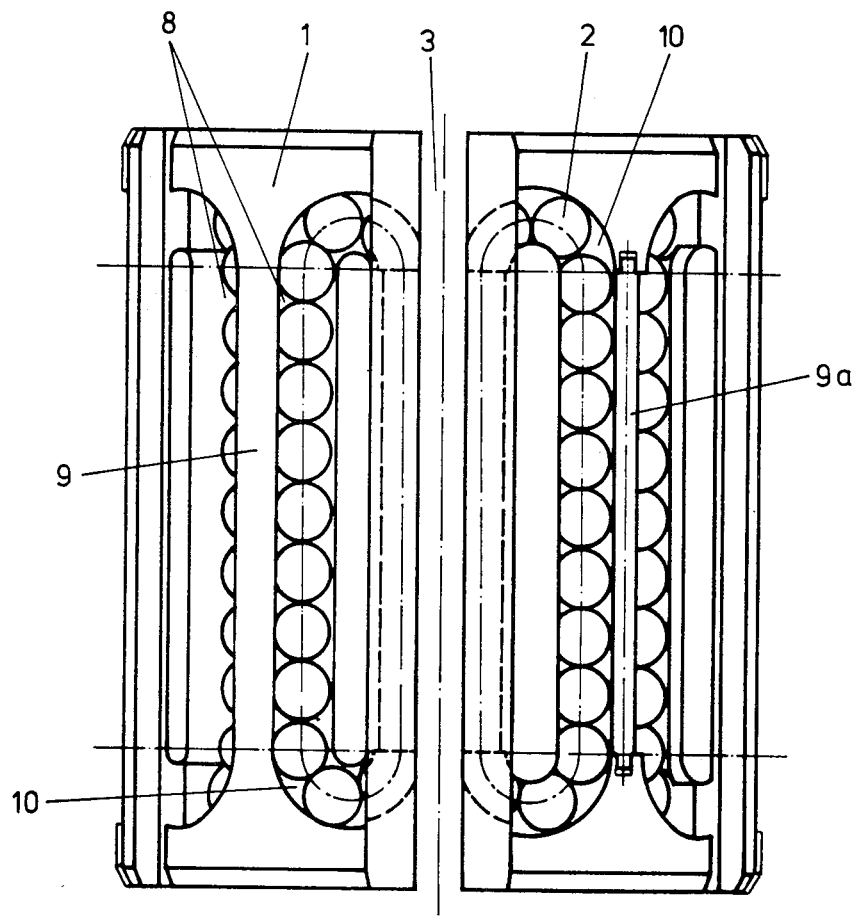

In the embodiment according to FIGS. 1a, and 2a the cross-pieces 9 arranged radially on the inside and outside are tapered in the direction of the ball pitch circle 11. Their width, measured in the circumferential direction, is zero at the level of the ball pitch circle 11.

In the variation shown in FIGS. 1b and 2b the radially outer cross-pieces 9 consist of wires 9a, both ends of which are attached to the cage 1, and which prevent the balls 2 from falling out of the return channels 8.

Further variations and alternatives will be apparent to those skilled in the art.

What is claimed is:

1. A ball box adapted to be mounted in a housing and having a load zone and a load-free zone for the recirculation of balls, comprising a plurality of continuous ball races formed by a cage, said ball races having a plurality of adjacent, axially directed return channels provided pairwise in said load-free zone, and the balls in said ball races, said return channels being separated from each other in said pairs by axially directed cross-pieces, the width of each said cross-piece, measured in the circumferential direction, being zero at the level of the ball pitch circle, said cross-pieces being positioned to inhibit contact of balls in adjacent return channels, thereby providing a minimum separation of the return channels while preventing contact of the balls of adjacent ball races.

2. The ball box of claim 1, wherein said cross-pieces have a cross-section tapered in the direction of said ball pitch circle.

3. The ball box of claim 1, wherein said cross-pieces are each formed by a wire contacting with said balls, both ends of said wire being attached to said cage.

4. In a ball box of the type wherein a cage is provided with a continuous race having an axially extending loaded zone and an axially extending load-free zone, the load-free zone of the races comprising adjacent return channels for a pair of races, each of said races being filled with balls, and race supports are provided for the balls in the loaded zone, the improvement comprising axially extending cross-pieces positioned between each pair of said adjacent return channels, said cross-pieces having zero width in the circumferential direction of the ball box at the ball pitch circle of the return channels, and being positioned to hold the balls of each pair of adjacent return channels spaced apart with a narrow spacing whereby balls in each return channel may circulate independently of the balls of the respective adjacent return channel.

* * * * *